May 6, 1952  K. H. FOX  2,595,349
DYNAMOELECTRIC MACHINE
Filed Oct. 6, 1949

INVENTOR.
KENNETH H. FOX
BY
ATTORNEY

Patented May 6, 1952

2,595,349

UNITED STATES PATENT OFFICE 2,595,349

DYNAMOELECTRIC MACHINE

Kenneth H. Fox, Fair Haven, N. J., assignor to Bendix Aviation Corporation, Teterboro, N. J., a corporation of Delaware Application October 6, 1949, Serial No. 119,884

4 Claims. (Cl. 171—252)

This invention relates to dynamoelectric machines, and more particularly to machines adapted for operation at high altitudes.

The numerous electrical and electronic devices used in present day aircraft require a wide range of voltages for their operation. The desired voltages are usually obtained from dynamotors operated off the conventional generator-battery system. In rotating equipment of this type considerable difficulty in commutation is encountered at high altitudes such as sparking and ring fire. With the increase in ceiling of the present day aircraft, the problem is increased.

In order to solve this problem, the invention as disclosed herein comprises mounting a dynamoelectric machine such as, for example, a dynamotor in a sealed casing and supported therein by resilient mounts.

One of the objects of the invention is to provide a dynamotor adapted to operate at all altitudes.

Another object is to provide improved method of mounting a dynamotor in a sealed container.

Another object is to provide improved means for mounting a dynamotor.

The above and other objects and features of the invention will appear more fully hereinafter from a consideration of the following description taken in connection with the accompanying drawings wherein one embodiment of the invention is illustrated by way of example.

Figure 1:
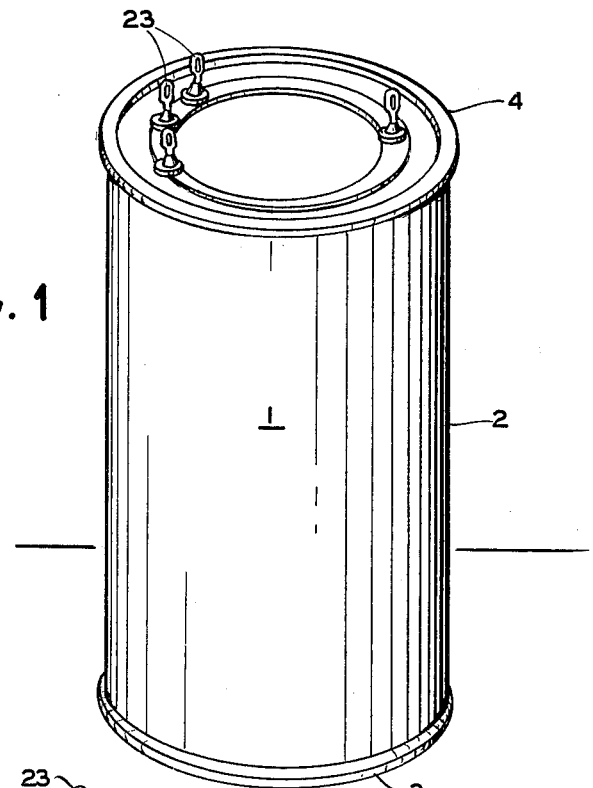
Figure 1 is a pictorial view of the completed unit.
Figure 2:
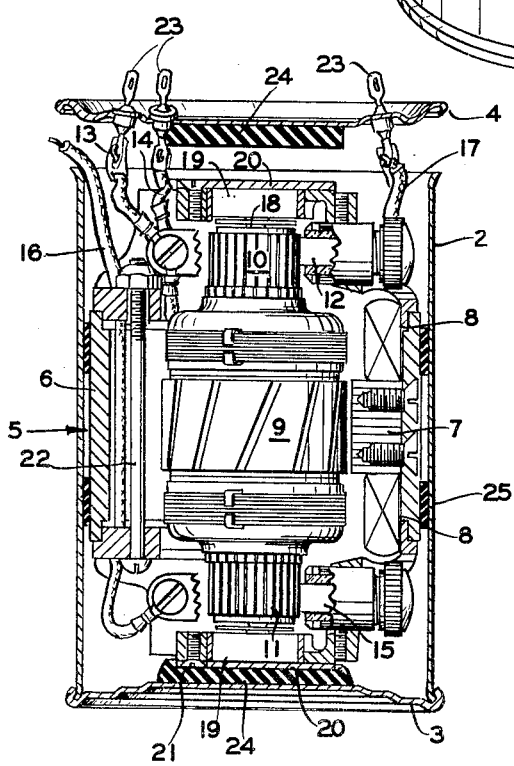
Figure 2 is a cutaway view illustrating one embodiment of mounting a dynamotor in a sealed casing.

Referring to the drawing, reference character 1 represents a sealed container, which may be of a conventional metal type, having a substantially cylindrical portion 2, and end pieces 3 and 4. A dynamotor 5, which may be any one of the many known to the art, comprises generally a frame 6 upon which are mounted pole pieces 7 disposed in the conventional manner on the interior of the frame 6, coils 8 of a proper number of turns are wound on the pole pieces 7 to provide the conventional north and south poles. Within and extending through pole pieces 7 is a rotor 9 having a commutator 10 at one end and a commutator 11 at the other. Brushes 12 are provided for connecting commutator 10 to input conductors 13 and 14. Brushes 15 are provided for connecting commutator 11 to output conductors 16 and 17. Rotor shaft 18, locked to the rotor 9 in any well known manner, is mounted in bearings 19 constituting part of the frame assembly 6. The bearings 19 are held in position by end plates 20 secured to the frame 6 by screws 21 or any other suitable manner. The frame 6 is secured together by the usual bolts 22.

Mounted in the cover piece 4 are glass bead insulators and terminal assemblies 23 and are securely bonded thereto. The respective terminals are connected to the conductors 13, 14, 16 and 17 by soldering or any other suitable method.

Resilient discs 24, which may be of rubber, neophrene or any other suitable material, are cemented or otherwise secured to the cover pieces 3 and 4 and are adapted to be compressed by the end plates 20 to securely hold the dynamotor therebetween. Surrounding the frame 6 are resilient bands 25 adapted to be compressed between the frame 6 and the cylindrical portion 2.

After the dynamotor has been placed in the casing with the resilient disc 24 and bands 25 in place, the covers 3 and 4 are hermetically sealed in place. By sealing the container under sea level pressures, this pressure is maintained thus providing sea level operating efficiency at high altitudes where reduced pressure would lower the operating efficiency. Further, the dynamotor is protected against shock and vibration in all directions by the resilient mountings 24 and 25 which serve to float the dynamotor in operation within the sealed can-like casing 1.

The hermetically sealed dynamotor is easily installed and removed from the aircraft to facilitate servicing. When repairs are needed, the hermetically sealed casing is easily opened such as with an ordinary can opener and then resealed in a fresh casing.

Although only one embodiment of the invention has been illustrated and described, various changes in the form and relative arrangement of the parts, which will now appear to those skilled in the art, may be made without departing from the scope of the invention.

What is claimed is:

1. In combination a dynamoelectric machine, a casing adapted to telescope said dynamoelectric machine, resilient rings surrounding said dynamotor and adapted for compression between said dynamoelectric machine and said casing, end members for said casing, resilient pads secured to said end members and arranged to be compressed between said end members and said dynamoelectric machine, one of said end members having insulated sealed terminal members therein, means for connecting said dynamoelectric machine to said terminal means for electrical connection therewith, and means for hermetically sealing said end members to said casing.

2. In combination, a dynamoelectric machine having a substantially cylindrical housing and end plates associated therewith, a substantially cylindrical member so proportioned to telescope said housing and extending axially thereof, a plurality of annular resilient rings adapted to surround said housing and be compressed between said housing and said cylindrical member, cap members for said cylindrical member, one of said cap members having sealed terminal members therein for electrical connection to said dynamoelectric machine, resilient pad members secured to said cap members and compressed between said cap members and said end plates to hold said dynamoelectric machine relative to said casing, and means for hermetically sealing said caps to said cylindrical member to form a unitary hermetically sealed structure.

3. The method of sealing a dynamoelectric machine in a container for operation at high altitudes comprising placing a plurality of resilient rings around said dynamoelectric machine, inserting in a cylinder and compressing said rings between said dynamoelectric machine and said cylinder, securing resilient pads to end caps, installing sealed terminal members in one of said caps, making electrical connections between said dynamoelectric machine and said terminals, and hermetically sealing said end members to said cylinder.

4. The method of sealing a dynamoelectric machine in a can for operation under varying atmospheric pressure comprising securing a resilient pad in the bottom of said can, placing a plurality of resilient rings around the dynamoelectric machine and inserting in the can so that the resilient rings are compressed between the dynamoelectric machine and the can, installing sealed terminal members in the top of said can, making electrical connections between said dynamoelectric machine and said terminals, inserting a resilient pad between said top and said dynamoelectric machine, and sealing said top on said can under sea level atmospheric pressure.

KENNETH H. FOX.

REFERENCES CITED

The following references are of record in the file of this patent:

UNITED STATES PATENTS

| Number | Name | Date |
|--------|------|------|
| 1,575,660 | Teipel et al. | Mar. 9, 1926 |
| 1,727,945 | Spreen | Sept. 10, 1929 |
| 1,943,240 | Lear et al. | Jan. 9, 1934 |
| 2,072,578 | Barrett et al. | Mar. 2, 1937 |
| 2,107,819 | Faber | Feb. 8, 1938 |
| 2,167,164 | Williams | July 25, 1939 |
| 2,245,761 | Clements | June 17, 1941 |
| 2,252,882 | Dressel | Aug. 19, 1941 |
| 2,319,934 | Korte et al. | May 25, 1943 |
| 2,372,749 | Taylor | Apr. 3, 1945 |
| 2,453,297 | Benson | Nov. 9, 1948 |
| 2,486,711 | Harris | Nov. 1, 1949 |
| 2,516,124 | Kishibay | July 25, 1950 |